US011979699B2

(12) United States Patent
Kim et al.

(10) Patent No.: US 11,979,699 B2
(45) Date of Patent: May 7, 2024

(54) SPEAKER DEVICE AND REFRIGERATOR COMPRISING SAME

(71) Applicant: SAMSUNG ELECTRONICS CO., LTD., Suwon-si (KR)

(72) Inventors: Kidu Kim, Suwon-si (KR); Jongyuk Lee, Suwon-si (KR); Suho Jo, Suwon-si (KR); Jonghun Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 141 days.

(21) Appl. No.: 17/837,789

(22) Filed: Jun. 10, 2022

(65) Prior Publication Data

US 2022/0303652 A1 Sep. 22, 2022

Related U.S. Application Data

(63) Continuation of application No. PCT/KR2020/015297, filed on Nov. 4, 2020.

(30) Foreign Application Priority Data

Dec. 12, 2019 (KR) ........................ 10-2019-0166090

(51) Int. Cl.
*H04R 1/02* (2006.01)
*F25D 11/00* (2006.01)
(Continued)

(52) U.S. Cl.
CPC ............... *H04R 1/028* (2013.01); *H04R 1/08* (2013.01); *H04R 1/26* (2013.01); *H04R 1/2834* (2013.01);
(Continued)

(58) Field of Classification Search
CPC . H04R 1/028; H04R 1/08; H04R 1/26; H04R 1/2834; H04R 1/345; H04R 3/00; H04R 2420/07; F25D 11/00
(Continued)

(56) References Cited

U.S. PATENT DOCUMENTS 9,774,938 B2 9/2017 Chien
10,429,124 B2 10/2019 Seo et al.
(Continued)

FOREIGN PATENT DOCUMENTS

JP 2019-515613 A 6/2019
KR 20-0330611 Y1 10/2003
(Continued)

OTHER PUBLICATIONS

International Search Report (PCT/ISA/210) dated Feb. 15, 2021 by the International Searching Authority in International Application No. PCT/KR2020/015297.
(Continued)

*Primary Examiner* — Sean H Nguyen
(74) *Attorney, Agent, or Firm* — Sughrue Mion, PLLC

(57) ABSTRACT

A speaker device configured to be embedded in a refrigerator door includes a body including an exposed surface that is exposed to an exterior, a side surface having an area that is greater than an area of the exposed surface, and a groove formed in the side surface and connected to the exposed surface, a first speaker provided on the exposed surface of the body, and a second speaker provided in the groove.

15 Claims, 11 Drawing Sheets

(51) Int. Cl.

| | |
|---|---|
| ***H04R 1/08*** | (2006.01) |
| ***H04R 1/26*** | (2006.01) |
| ***H04R 1/28*** | (2006.01) |
| ***H04R 1/34*** | (2006.01) |
| ***H04R 3/00*** | (2006.01) |

(52) U.S. Cl.

CPC ............... *H04R 1/345* (2013.01); *H04R 3/00* (2013.01); *F25D 11/00* (2013.01); *H04R 2420/07* (2013.01)

(58) Field of Classification Search

USPC .......................................................... 381/335

See application file for complete search history.

(56) References Cited

U.S. PATENT DOCUMENTS

| | | | |
|---|---|---|---|
| 10,735,850 | B2 | 8/2020 | Größler et al. |
| 2015/0146904 | A1 | 4/2015 | Chien |
| 2020/0245062 | A1 | 7/2020 | Son et al. |

FOREIGN PATENT DOCUMENTS

| | | | | | |
|---|---|---|---|---|---|
| KR | 10-2008-0057639 | A | | 6/2008 | |
| KR | 10-1245886 | B1 | | 3/2013 | |
| KR | 20160100731 | A | * | 8/2016 | ............. F25D 11/00 |
| KR | 10-2017-0027007 | A | | 3/2017 | |
| KR | 10-1815062 | B1 | | 1/2018 | |
| KR | 10-1830372 | B1 | | 2/2018 | |
| KR | 10-2019-0040608 | A | | 4/2019 | |
| WO | 2019/150635 | A1 | | 8/2019 | |
| WO | 2019/198281 | A1 | | 10/2019 | |

OTHER PUBLICATIONS

Written Opinion (PCT/ISA/237) dated Feb. 15, 2021 by the International Searching Authority in International Application No. PCT/KR2020/015297.

Communication issued on Dec. 6, 2023 by the Korean Intellectual Property Office in Korean Patent Application No. 10-2019-0166090.

* cited by examiner

SPEAKER DEVICE AND REFRIGERATOR COMPRISING SAME

CROSS-REFERENCE TO RELATED APPLICATION(S)

This application is a by-pass continuation of International Application No. PCT/KR2020/015297, filed on Nov. 4, 2020, which is based on and claims priority to Korean Patent Application No. 10-2019-0166090, filed on Dec. 12, 2019, in the Korean Intellectual Property Office, the disclosures of which are incorporated by reference herein in their entireties.

BACKGROUND

1. Field

The disclosure relates to a speaker device and a refrigerator including the same, and more particularly, to a speaker device that can improve the performance of the speaker in a limited space, and a refrigerator including the same.

2. Description of Related Art

In general, a refrigerator is a home appliance that includes a storage chamber keeping food, and a cold air supplying device that supplies cold air to the storage chamber, thereby keeping food fresh.

A conventional refrigerator could only perform a function for simply keeping food in a low temperature state. However, as technologies have developed, there is a rising demand for a refrigerator having additional functions other than a food keeping function.

As an example of an additional function, a speaker that can generate various sounds may be included in a refrigerator.

A speaker is a device that modifies an electronic signal into a sound wave, and for transmitting a sound wave, a speaker should be constituted to be able to be connected to the outside. Accordingly, there is a problem that a location wherein a speaker is arranged in a refrigerator is limited.

In case a speaker is mounted on a main body of a refrigerator, when the door of the refrigerator is closed, there is a problem that progression of a sound to the front is inhibited.

Also, in case a speaker is located on the lower end of the door, there is a problem that the sound quality is limited, and it is difficult for a sound to reach a user.

In case a speaker is toward the front surface of the door, there is a problem that a separate space where the sound of the speaker can be emitted is needed on the front surface of the refrigerator and thus the design is inhibited, and the refrigerator door becomes thick for a heat radiating design.

SUMMARY

Provided are a speaker device that is located inside a door of a refrigerator, and that can improve the performance of the speaker arranged in a limited space, and a refrigerator including the same.

Additional aspects will be set forth in part in the description which follows and, in part, will be apparent from the description, or may be learned by practice of the presented embodiments.

According to an aspect of the disclosure, a speaker device configured to be embedded in a refrigerator door may include a body including an exposed surface that is exposed to an exterior, a side surface having an area that is greater than an area of the exposed surface, and a groove formed in the side surface and connected to the exposed surface, a first speaker provided on the exposed surface of the body, and a second speaker provided in the groove.

The second speaker may include an arrangement area on the side surface that is greater than an arrangement area of the first speaker.

The second speaker may be configured to output sound that is reflected by a member inside the refrigerator door or a guide member provided to face the second speaker, and is output to the exposed surface.

The first speaker may include a tweeter, and a second speaker may include a woofer.

The speaker device may include a passive radiator provided on the side surface.

The second speaker may be configured to output sound having a frequency band of about 3 kHz or lower.

According to an aspect of the disclosure, a refrigerator may include a body including a storage chamber, a door configured to open or close the storage chamber, the door include a handle area, and a speaker device including one surface that is exposed to the handle area, remaining surfaces embedded in the door, a first speaker configured to output sound directly to the handle area, and a second speaker configured to output sound that is reflected by a reflecting member provided inside the door and output to the handle area.

The door may include an upper door provided in an upper portion of a front surface of the main body, and the speaker device may be provided in a lower portion of the upper door.

The handle area may be located between the upper door and a lower door.

The door may include a left side door provided on a left side of a front surface of the main body or a right side door provided on a right side of the front surface of the main body, and the speaker device may be provided on a right side surface of the left side door or a left side surface of the right side door.

A guide member may be provided in the handle area, and may be configured to reflect sound output from the speaker device to a front surface of the refrigerator.

The refrigerator may further include a first communication device configured to provide an acoustic signal to the speaker device by a wireless communication method, and the speaker device may include a second communication device configured to receive the acoustic signal by the wireless communication method.

The speaker device may include a microphone provided on one side of the speaker device.

The speaker device may include a body having an exposed surface that is exposed to the handle area, a groove connected to the exposed surface, the groove being formed in a side surface having an area that is greater than an area of the exposed surface. The first speaker may be provided on the exposed surface of the body and the second speaker may be provided in the groove.

The second speaker may include an arrangement area on the side surface that is greater than an arrangement area of the first speaker on the exposed surface.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
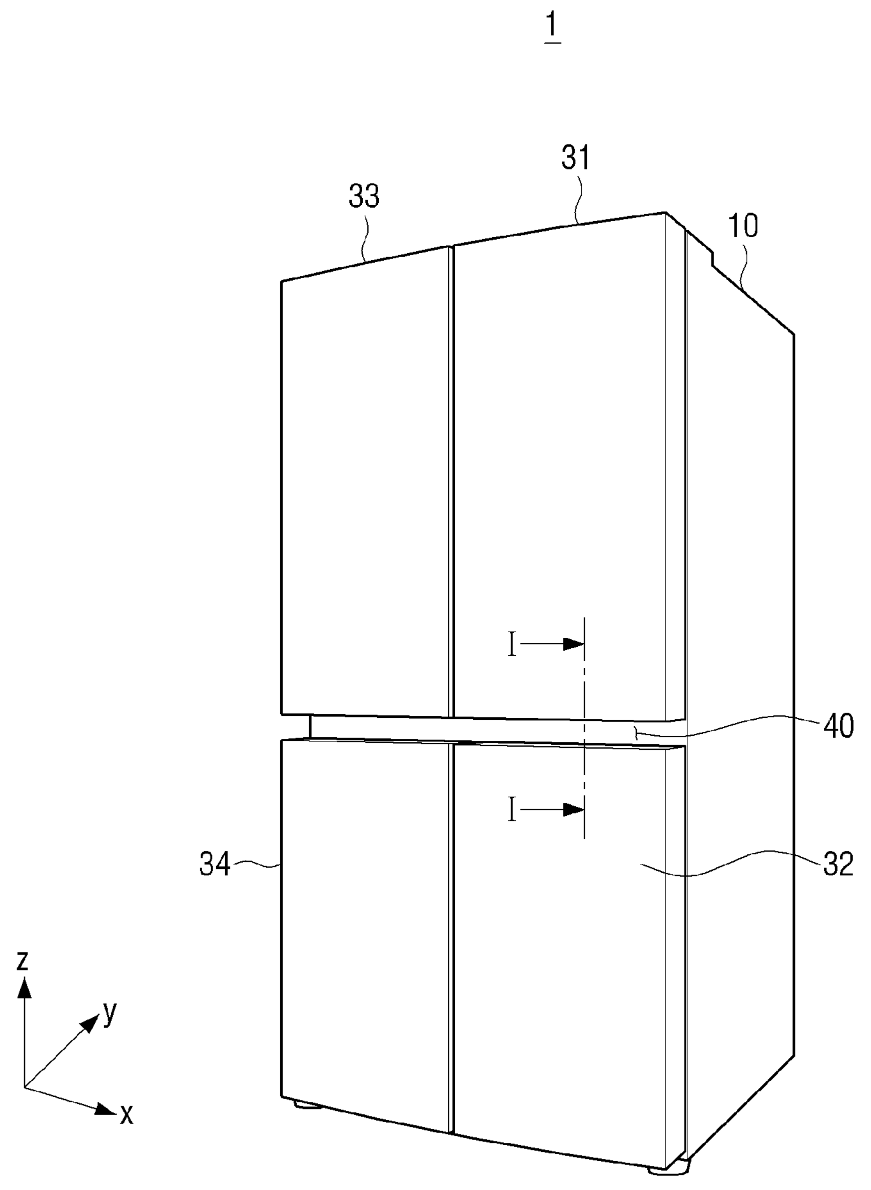
FIG. 1 is a perspective view schematically illustrating a refrigerator according to an embodiment.

The embodiments described below are exemplary embodiments for promoting understanding of the disclosure, and it should be noted that the disclosure may be implemented while being modified in various forms, unlike the embodiments described herein. In explaining the disclosure below, in case it is determined that detailed explanation of related known functions or components may unnecessarily confuse the gist of the disclosure, the detailed explanation and detailed illustration will be omitted. Also, in the accompanying drawings, some components may not be illustrated according to their actual sizes but they may be illustrated in exaggerated sizes, for promoting understanding of the disclosure.

Also, as terms used in this specification and the claims, general terms were selected in consideration of the functions described in the disclosure. However, the terms may vary depending on the intention of those skilled in the art who work in the pertinent field or legal or technical interpretation, and emergence of new technologies, etc. Also, there are some terms that were designated by the applicant on his own, and in such cases, the meaning of the terms may be interpreted as what is defined in this specification. If there is no specific definition of the terms, the meaning of the terms may be interpreted based on the overall content of this disclosure and technical knowledge common in the pertinent technical field.

In addition, in the description of the disclosure, the order of each step should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps.

Further, in this disclosure, expressions such as “have,” “may have,” “include,” and “may include” denote the existence of such characteristics (e.g.: elements such as numbers, functions, operations, and components), and do not exclude the existence of additional characteristics.

Also, terms such as “first,” “second,” and the like may be used to describe various components, but the components are not intended to be limited by the terms. The terms may be used only to distinguish one component from another component. For example, a first component may be called a second component, and a second component may be called a first component in a similar manner, without departing from the scope of the disclosure.

In addition, terms such as ‘the front surface,’ ‘the rear surface,’ the upper surface,' ‘the lower surface,’ the side surface,' ‘the left side,’ ‘the right side,’ ‘the upper part,’ ‘the lower part,’ etc., used in the disclosure were defined based on the drawings, and the shapes and locations of respective elements are not limited by these terms.

Also, in this disclosure, elements necessary for description of each embodiment of the disclosure were explained, and thus elements are not necessarily limited thereto. Accordingly, some elements may be modified or omitted, or other elements may be added. In addition, elements may be arranged while being dispersed to devices independent from one another.

Further, while the embodiments of the disclosure will be described in detail with reference to the following accompanying drawings and the content described in the accompanying drawings, it is not intended that the disclosure is restricted or limited by the embodiments.

Hereinafter, the disclosure will be described in more detail with reference to FIG. 1 to FIG. 11.

Figure 2:
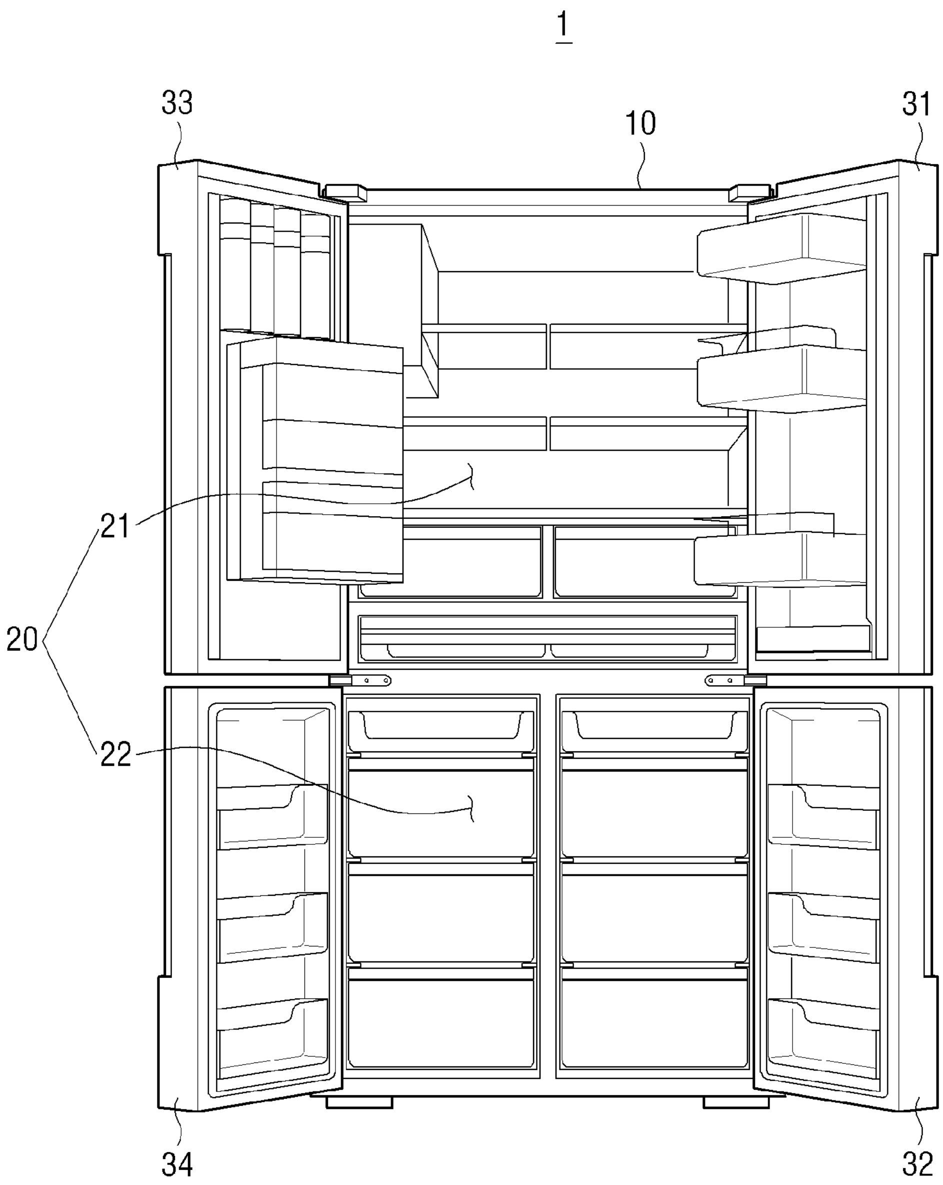
FIG. 2 is a front side view schematically illustrating an inside of a refrigerator according to an embodiment.

FIG. 1 is a perspective view schematically illustrating a refrigerator 1 according to an embodiment. FIG. 2 is a front side view schematically illustrating the inside of the refrigerator 1 according to an embodiment.

The refrigerator 1 is a device that supplies cold air generated by a refrigerating cycle to a storage chamber, and may thereby maintain freshness of various kinds of food for a long time.

Referring to FIG. 1 to FIG. 2, the refrigerator 1 according to an embodiment of the disclosure may include a main body 10, and doors 31, 32, 33, 34 that can open or close a storage chamber 20.

In FIG. 1, four doors 30 are illustrated, but the number of the doors 30 is not limited thereto, and the locations and the shapes of the doors 30 may also be arranged in various ways. According to the arrangements of the doors 30 and the storage chamber 20, the refrigerator 1 may be a French door type, a side-by-side type, etc.

Among the plurality of doors 31, 32, 33, 34, a handle area 40 which is an empty space where a user can put his hand so as to open the doors 30 may exist. In the lower part of the upper doors 31, 33 arranged in the upper part of the front surface of the main body 10, a speaker device 100 may be embedded.

The speaker device 100 is a device that modifies an electronic signal into a sound wave, and it may output various sounds. The structure where the speaker device 100 is embedded in the lower part of the upper door 31 will be described later in FIG. 3 to FIG. 5.

Referring to FIG. 2, the refrigerator 1 may include a storage chamber 20 that can keep various kinds of food refrigerated or frozen. The storage chamber 20 may be divided into a refrigerating chamber 21 where food is kept cold at a temperature above zero, and a freezing chamber 22 where various kinds of food is kept at a temperature below zero.

In the refrigerator 1, parts such as a compressor, a condenser, an expander, an evaporator, etc. for constituting a refrigerating cycle may be provided.

Hereinafter, the structure where the speaker device 100 is embedded in a refrigerator door 31 according to an embodiment of the disclosure will be described with reference to FIG. 3 to FIG. 5.

Figure 3:
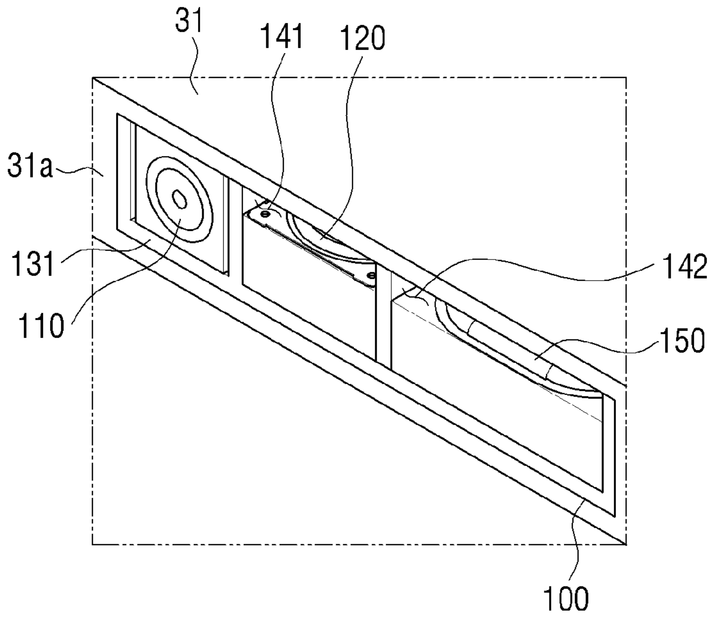
FIG. 3 is a lower perspective view of a refrigerator door according to an embodiment.

FIG. 3 is a lower perspective view of a refrigerator door 30 according to an embodiment.

The speaker device 100 according to an embodiment of the disclosure may be arranged such that it is embedded in the lower part of the upper door 31, and one surface of the speaker device 100 may be exposed to the handle area 40. Accordingly, a sound output from the speaker device 100 may be emitted to the outside through the handle area 40.

The embedded location of the speaker device 100 is not limited to the upper door 31, and the speaker device 100 may be arranged on at least one end of the plurality of doors 31, 32, 33, 34.

The speaker device 100 may include a first speaker 110 arranged to output a sound directly to the handle area 40, and a second speaker 120 arranged such that a sound reflected by an inner wall 31*c* of the upper door, or a reflecting member or a guide member, etc. provided on the inner wall 31*c* of the upper door is output to the handle area 40. Also, in the handle area 40, a guide member that reflects a sound output from the speaker device 100 to the front surface direction of the refrigerator 1 may be arranged.

Detailed explanation regarding the structure and output of a sound of the speaker device 100 will be described later in FIG. 6 to FIG. 7.

Figure 4:
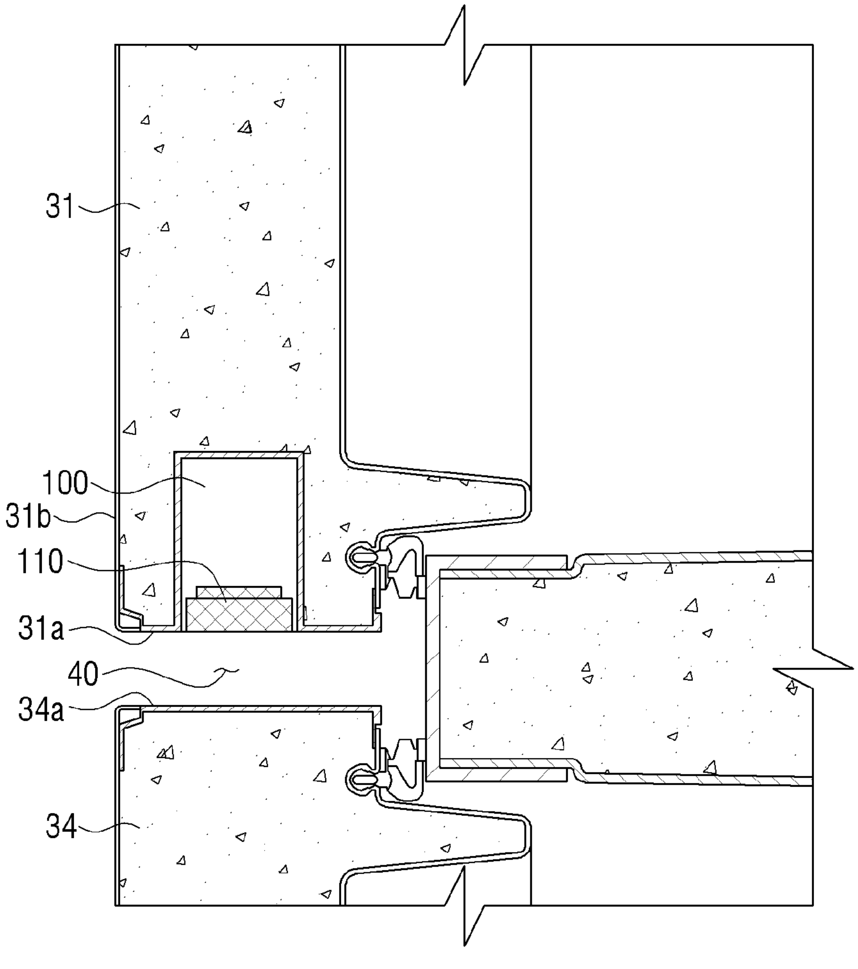
FIG. 4 is a cross-sectional view that enlarged a cross-section of a first speaker along the line I-I indicated in FIG. 1 according to an embodiment.

FIG. 4 is a cross-sectional view that enlarged a cross-section of the first speaker 110 along the line I-I indicated in FIG. 1 according to an embodiment. FIG. 5 is a cross-sectional view that enlarged a cross-section of the second speaker 120 along the line I-I indicated in FIG. 1 according to an embodiment.

Referring to FIG. 4, the first speaker 110 may be arranged to face the upper surface 32*a* of the lower door from the lower part of the upper door 31, and may output a sound directly to the handle area 40 formed between the lower surface 31*a* of the upper door and the upper surface 32*a* of the lower door.

Figure 5:
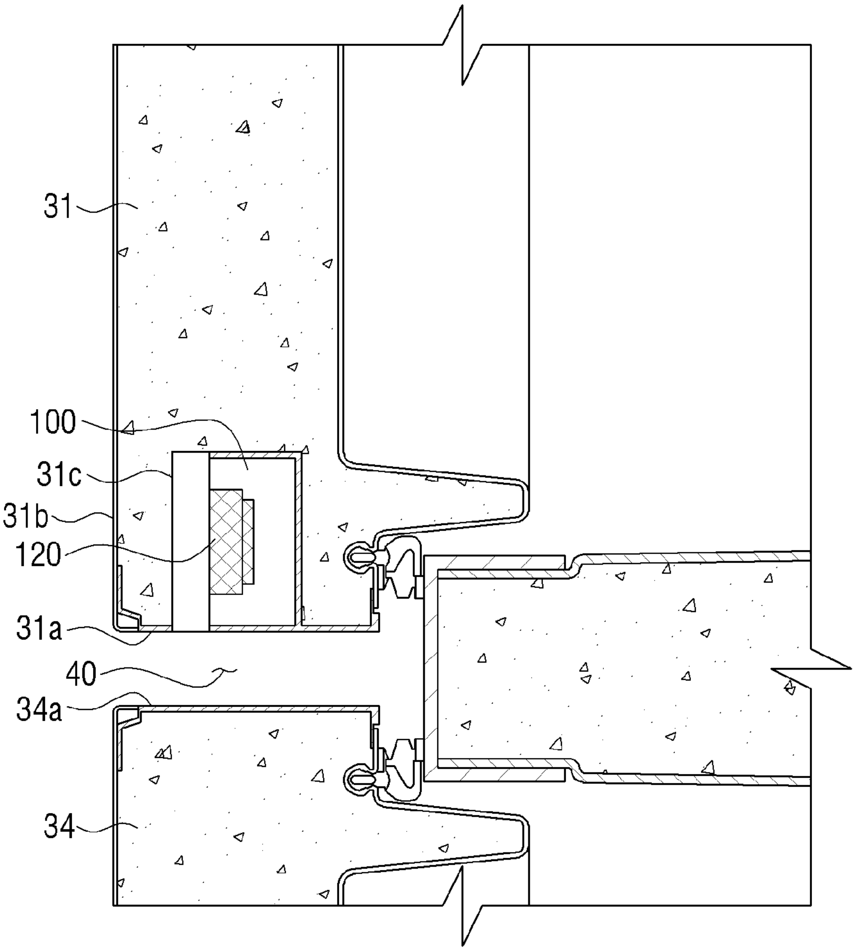
FIG. 5 is a cross-sectional view that enlarged a cross-section of a second speaker along the line I-I indicated in FIG. 1 according to an embodiment.

Referring to FIG. 5, the second speaker 120 may be arranged such that it is embedded in the upper door 31 and faces the inner wall 31*c* of the upper door 31, and a space formed between the second speaker 120 and the inner wall 31*c* of the upper door may be connected with the handle area 40.

Detailed explanation regarding output of a sound according to the structure where the first speaker 110 and the second speaker 120 are embedded in the doors 30 will be described later in FIG. 8 to FIG. 9.

Although not illustrated in FIG. 1 to FIG. 5, the refrigerator 1 may include a first communication device that provides an acoustic signal to the speaker device 100 by a wireless communication method, and the speaker device 100 may include a second communication device that receives an acoustic signal provided from the first communication device by the wireless communication method.

Also, the speaker device 100 may include a microphone that receives input of a sound signal on one side. The microphone may also be arranged on the refrigerator door 30 or the main body 10.

In addition, in the refrigerator 1, a processor controlling operations of the speaker device 100, etc. may be included. In this case, the refrigerator may include a communication device that provides a first signal and a second signal that the processor generated by using sound source data respectively to the first speaker 110 and the second speaker 120.

By virtue of the structure where the speaker device 100 is embedded inside the doors 30 of the refrigerator, in case a user views the refrigerator 1 from the front surface or the side surface, the speaker device 100 is not exposed in the exterior of the refrigerator 1, and thus there may be an effect that the refrigerator 1 is felt aesthetical to the user.

Hereinafter, the speaker device 100 according to an embodiment of the disclosure will be explained with reference to FIG. 6 to FIG. 7.

Figure 6:
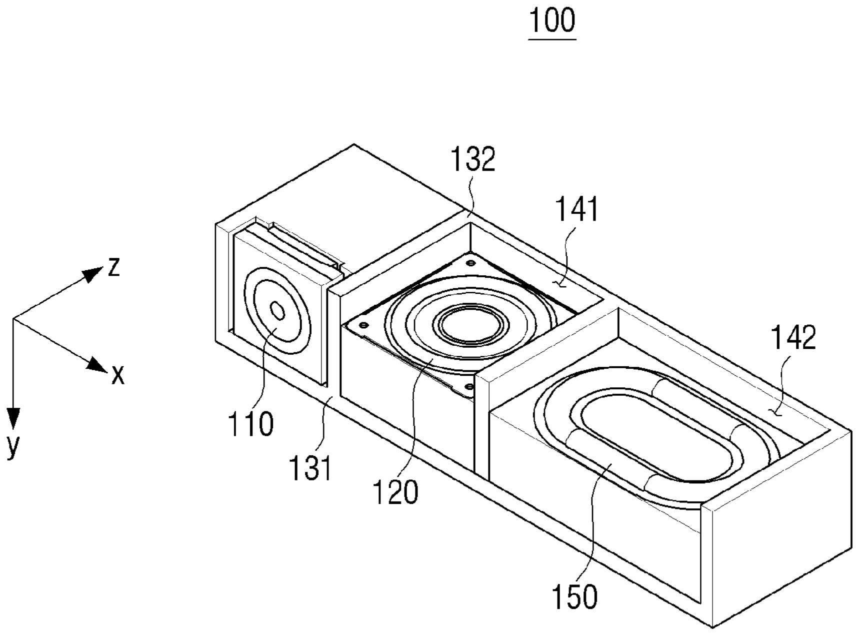
FIG. 6 is a perspective view illustrating a speaker device according to an embodiment.
Figure 7:
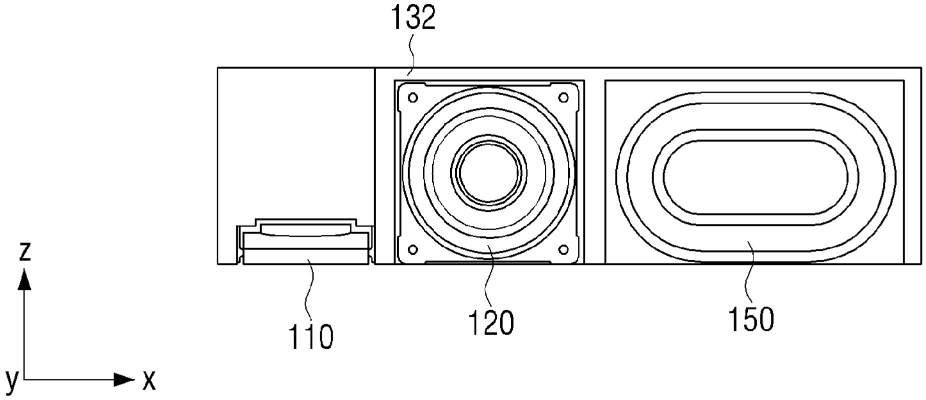
FIG. 7 is a front side view of a speaker device according to an embodiment.

FIG. 6 is a perspective view illustrating the speaker device 100 according to an embodiment, FIG. 7 is a front side view of the speaker device 100 according to an embodiment.

Referring to FIG. 6 to FIG. 7, the speaker device 100 according to an embodiment of the disclosure may include a body 130 having a first groove 141 and a second groove 142, a first speaker 110, a second speaker 120, and a passive radiator 150. The passive radiator 150 is a device for reinforcing low sounds.

The speaker device 100 may be embedded in the refrigerator door 30. In this case, in the speaker device 100, an exposed surface 131 which is a surface exposed to the handle area 40 outside the refrigerator door 30, and a side surface 132 having a wider area than the area of the exposed surface 131 may exist.

Referring to FIG. 6 to FIG. 7, the exposed surface 131 falls under a surface viewing the speaker device 100 in the Z axis direction. The side surface 132 having a wider area than the area of the exposed surface 131 is a surface viewing the speaker device 100 in the Y axis direction (corresponding to FIG. 7).

The first groove 141 and the second groove 142 may be located in the side surface 132 of the speaker device 100, and they may be connected to the exposed surface 131. That is, the first groove 141 and the second groove 142 may have specific depth from the exposed surface 131, and at the same time, they may have specific depth from the side surface 132.

The first speaker 110 may be arranged on the exposed surface 131 of the speaker device 100, and output a sound to a direction perpendicular to the exposed surface 131 (−Z axis direction). In this case, the first speaker 110 may be a tweeter. Also, the first speaker 110 may be a speaker that mainly outputs sounds of frequency bands of 3 kHz or higher.

The second speaker 120 may be arranged in the first groove 141 of the speaker device 100, and output a sound to a direction perpendicular to the side surface 132 (−Y axis direction). In this case, the second speaker 120 may be a woofer. Also, the second speaker 120 may be a speaker that mainly outputs sounds of frequency bands of 3 kHz or lower.

The passive radiator 150 is a speaker that is used together with a woofer for reinforcing low sounds at a speaker. The passive radiator 150 may be arranged in the second groove 142 of the speaker device 100, and reinforce a sound output from the second speaker 120.

In case the second speaker 120 and the passive radiator 150 are respectively arranged in the first groove 141 and the second groove 142, empty spaces excluding the spaces occupied by the second speaker 120 and the passive radiator 150 may exist in the first groove 141 and the second groove 142.

Because of the aforementioned empty spaces in the first groove 141 and the second groove 142, a sound output from the second speaker 120 embedded inside the refrigerator door 30 may be emitted to the outside. A specific operation where a sound output from the second speaker 120 is emitted to the outside will be described later in FIG. 9.

Hereinafter, output of a sound by the speaker device 100 embedded in the refrigerator 1 according to an embodiment of the disclosure will be described with reference to FIG. 8 to FIG. 9.

Figure 8:
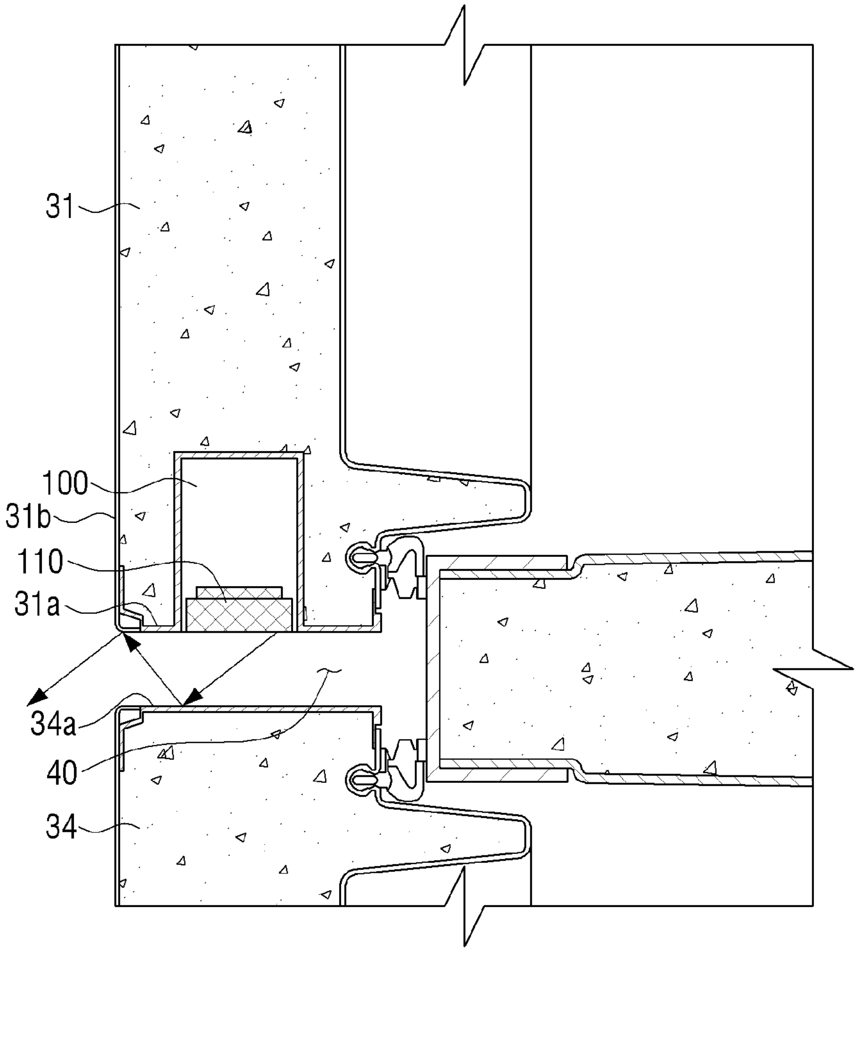
FIG. 8 is a diagram of an output of a sound by a first speaker according to an embodiment.

FIG. 8 is a diagram of an output of a sound by the first speaker 110 according to an embodiment. FIG. 9 is a diagram of an output of a sound by the second speaker 120 according to an embodiment.

Hereinafter, the disclosure will be described based on a case where the first speaker 110 is a tweeter, and the second speaker 120 is a woofer. However, the disclosure is not limited to such a structure, and the first speaker 110 and the second speaker 120 may be a sub-woofer, a woofer, and a mid-woofer, and they may be a mid-range speaker such as a squawker. Also, they can obviously be any one of tweeters or super tweeters.

A tweeter corresponding to the first speaker 110 is a speaker for outputting a high pitch, and in general, it may make a sound having a high frequency of a band of 3 kHz or higher.

A woofer corresponding to the second speaker 120 is a speaker for outputting a low pitch, and in general, it may make a sound having a low frequency of a band from 40 Hz to 3 kHz.

A sound of a high pitch has a relatively short wavelength compared to a sound of a low pitch, and thus it is closer to a ray movement such as a light than a wave movement such as a water wave. Accordingly, a sound of a high pitch can be easily absorbed when it collides with an obstacle.

In contrast, in a sound of a low pitch having a big wavelength, a diffraction where the sound changes its proceeding direction as it goes around a wall surface like water flows can occur easily.

Accordingly, for transmitting a sound of a high pitch, the proceeding direction of the sound plays an important role. In contrast, when transmitting a sound of a low pitch, the size of the vibration plate of the speaker, i.e., an area that the speaker can occupy plays a more important role than the proceeding direction of the sound.

Referring to FIG. 8, a sound of a high pitch output from the first speaker 110 of the speaker device 100 embedded inside the upper door 31 to the handle area 40 may be emitted to the outside directly, or it may be reflected on the upper surface 32*a* of the lower door facing the lower surface 31*a* of the upper door, and emitted to the outside.

Also, a sound output from the first speaker 110 to the handle area 40 may be reflected on the upper surface 32*a* of the lower door facing the lower surface 31*a* of the upper door, and then reflected on the lower surface 31*a* of the upper door, and emitted to the outside (refer to the arrows).

Accordingly, in a limited arrangement where the first speaker 110 is embedded inside the upper door 31 of the refrigerator, reflection of a sound of a high pitch output by the first speaker 110 is minimized and the sound is emitted to the outside, and thus excessive degradation of the sound quality of the sound of a high pitch can be prevented.

Figure 9:
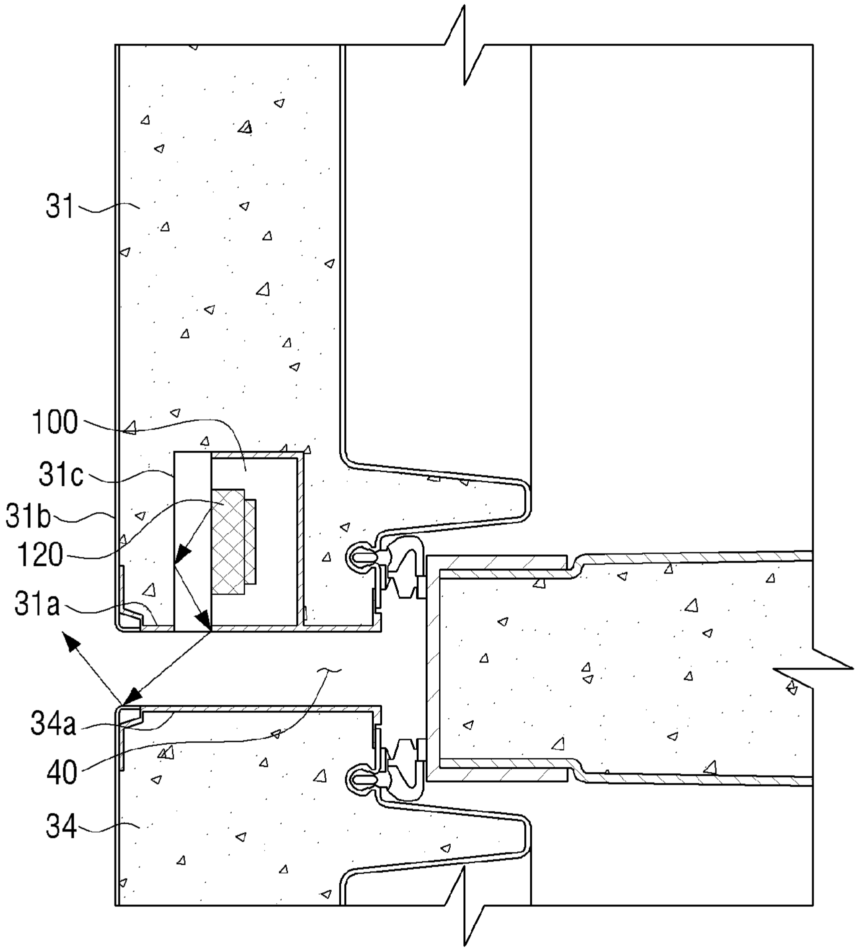
FIG. 9 is a diagram of an output of a sound by a second speaker according to an embodiment.

Referring to FIG. 9, a sound of a low pitch output from the second speaker 120 of the speaker device 100 embedded inside the upper door 31 may be reflected on the inner wall 31*c* of the upper door and emitted to the handle area 40, and reflected on the upper surface 32*a* of the lower door or reflected on the upper surface 32*a* of the lower door and the lower surface 31*a* of the upper door, and emitted to the outside (refer to the arrows). On the inner wall 31*c* of the upper door, a reflecting member or a guide member that can make reflection of a sound smooth may be arranged.

In this case, the second speaker 120 is arranged on the side surface 132 of the speaker device 100 having a wider area than the exposed surface 131 of the speaker device 100 where the first speaker 110 is arranged, and thus the second speaker 120 may include a vibration plate having a bigger area than the vibration plate of the first speaker 110.

Accordingly, in a limited arrangement where the second speaker 120 is embedded inside the upper door 31 of the refrigerator, the area of the vibration plate of the second speaker 120 where a sound of a low pitch output by the second speaker 120 is generated can be maximized.

Also, as a sound is reflected on the inner wall 31*c* of the upper door first, the number of times of reflection is a lot compared to a sound of a high pitch output from the first speaker 110, but as a sound output from the second speaker 120 has a lower pitch than a sound output from the first speaker 110, the sound may be less negatively influenced in its sound quality by reflection.

Accordingly, by virtue of the aforementioned structure where the first speaker 110 and the second speaker 120 are arranged inside the refrigerator door 30, and the characteristic that the speakers respectively output sounds of different pitches, the performance of the speaker device 100 arranged in a limited space can be improved.

Hereinafter, a refrigerator 2 according to another embodiment of the disclosure will be described with reference to FIG. 10 to FIG. 11.

Figure 10:
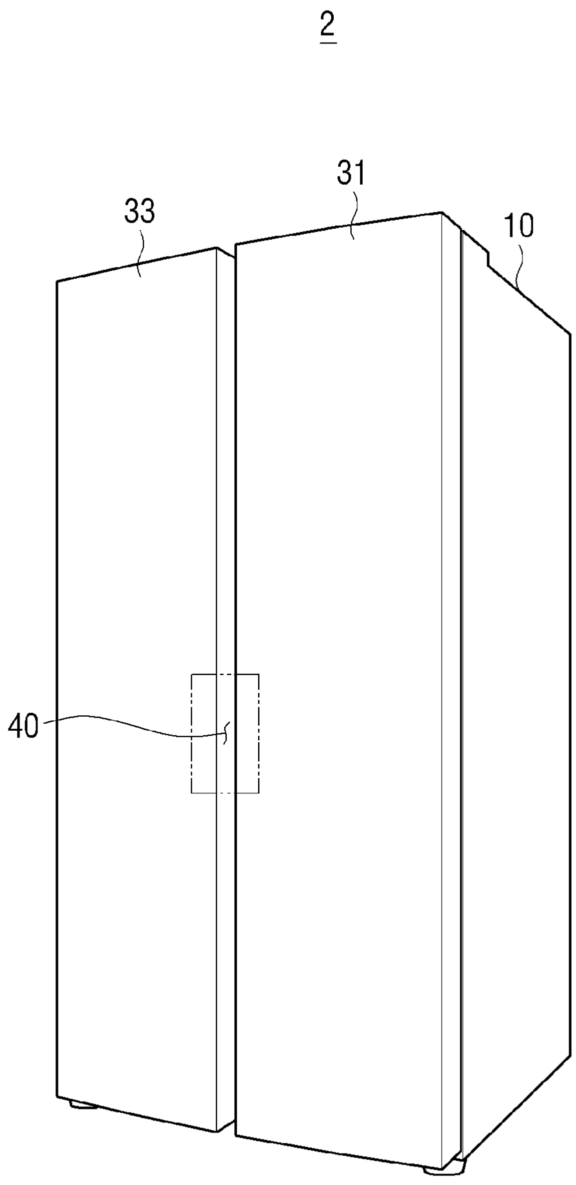
FIG. 10 is a perspective view illustrating a modified example of a refrigerator according to an embodiment.

FIG. 10 is a perspective view illustrating the refrigerator 2 according to an embodiment of the disclosure. FIG. 11 is a diagram of a portion FIG. 10 that is enlarged according to an embodiment.

Referring to FIG. 10, the refrigerator 2 may include a main body 10, and doors 31, 33 that can open or close a storage chamber.

Between the left side door 33 and the right side door 31, a handle area 40 which is an empty space where a user can put his hand so as to open the doors 31, 33 may exist. In this case, on the right side surface of the left side door 33 arranged on the left side of the front surface of the main body 10, or on the left side surface of the right side door 31 arranged on the right side of the front surface of the main body 10, a speaker device 100 may be embedded.

Figure 11:
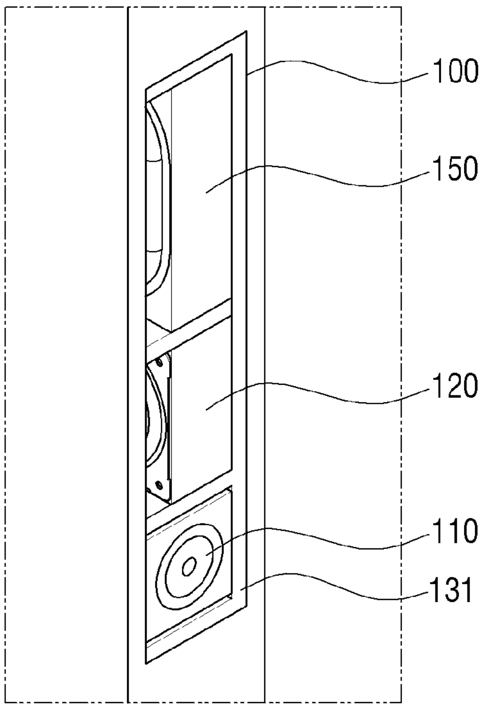
FIG. 11 is a diagram of a portion FIG. 10 that is enlarged according to an embodiment.

FIG. 11 is a diagram that enlarged the left side door 33, the right side door 31, and the handle area 40 between them in FIG. 10, and it illustrates a speaker device 100 embedded in the right side surface of the left side door 33. As the structure where the speaker device 100 is embedded in the doors 30 and output of a sound by the speaker device 100 were described in detail in the previous drawings, explanation in that regard will be omitted.

While embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A speaker device configured to be embedded in a refrigerator door, the speaker device comprising:

a body comprising:

an exposed surface that is exposed to an exterior;

a side surface having an area that is greater than an area of the exposed surface; and a groove formed in the side surface and connected to the exposed surface;

a first speaker provided on the exposed surface of the body; and a second speaker provided in the groove.

2. The speaker device of claim 1, wherein the second speaker comprises an arrangement area on the side surface that is greater than an arrangement area of the first speaker.

3. The speaker device of claim 1, wherein the second speaker is configured to output sound that is reflected by a member inside the refrigerator door or a guide member provided to face the second speaker, and is output to the exposed surface.

4. The speaker device of claim 1, wherein the first speaker comprises a tweeter, and wherein the second speaker comprises a woofer.

5. The speaker device of claim 1, further comprising a passive radiator provided on the side surface.

6. The speaker device of claim 1, wherein the second speaker is configured to output sound having a frequency band of about 3 kHz or lower.

7. A refrigerator comprising:

a main body comprising a storage chamber;

a door configured to open or close the storage chamber, the door comprising a handle area; and a speaker device comprising:

one surface that is exposed to the handle area, remaining surfaces embedded in the door, a first speaker configured to output sound directly to the handle area, and a second speaker configured to output sound that is reflected by a reflecting member provided inside the door and output to the handle area.

8. The refrigerator of claim 7, wherein the door comprises an upper door provided in an upper portion of a front surface of the main body, and wherein the speaker device is provided in a lower portion of the upper door.

9. The refrigerator of claim 8, wherein the handle area is located between the upper door and a lower door.

10. The refrigerator of claim 7, wherein the door comprises a left side door provided on a left side of a front surface of the main body or a right side door provided on a right side of the front surface of the main body, and wherein the speaker device is provided on a right side surface of the left side door or a left side surface of the right side door.

11. The refrigerator of claim 7, further comprising a guide member provided in the handle area, and configured to reflect sound output from the speaker device to a front surface of the refrigerator.

12. The refrigerator of claim 7, further comprising:

a first communication device configured to provide an acoustic signal to the speaker device by a wireless communication method, wherein the speaker device further comprises a second communication device configured to receive the acoustic signal by the wireless communication method.

13. The refrigerator of claim 7, wherein the speaker device further comprises a microphone provided on one side of the speaker device.

14. The refrigerator of claim 7, wherein the speaker device further comprises:

a body comprising an exposed surface that is exposed to the handle area, a groove connected to the exposed surface, the groove being formed in a side surface having an area that is greater than an area of the exposed surface, wherein the first speaker is provided on the exposed surface of the body, and wherein the second speaker is provided in the groove.

15. The refrigerator of claim 14, wherein the second speaker comprises an arrangement area on the side surface that is greater than an arrangement area of the first speaker on the exposed surface.

* * * * *